United States Patent [19]

Murdock

[11] Patent Number: 4,927,206

[45] Date of Patent: May 22, 1990

[54] PICKUP TRUCK CAP

[76] Inventor: Clifford R. Murdock, 2392 Printup Rd., Sanborn, N.Y. 14132

[21] Appl. No.: 367,610

[22] Filed: Jun. 19, 1989

Related U.S. Application Data

[63] Continuation-in-part of Ser. No. 206,433, Aug. 22, 1988, abandoned.

[51] Int. Cl.⁵ .............................................. B62D 25/00
[52] U.S. Cl. .................................................... 296/156
[58] Field of Search .......................... 296/156, 10, 100

[56] References Cited

U.S. PATENT DOCUMENTS

| 2,848,274 | 8/1958 | Geisler | 296/156 |
| 3,390,913 | 7/1968 | Hunter | 296/164 |
| 4,431,228 | 2/1984 | Grise | 296/100 |
| 4,452,482 | 6/1984 | Grise | 296/10 |

*Primary Examiner*—Robert R. Song
*Attorney, Agent, or Firm*—Wallace F. Neyerlin

[57] ABSTRACT

The invention relates to an improved shell-type pickup truck cap having a means for preventing damage to the cap when it is being installed on, or removed from, the bed of a pickup truck, or when said cap is being transported to or from storage. The cap comprises a substantially planar top, longitudinal sidewalls and a rear wall of a substantially inverted U-shaped configuration, which typically is or includes a hatch. An elongated support, or spacing bar, is provided to be rigidly positioned across the opposite internal bottom portions of the sidewalls. The support bar is suitably detachably secured to the bottom rear portions of each of the sidewalls to span the distance between the sidewalls and to substantially prevent inward or outward movement of the sidewalls. In this manner damage to the upper rear of the cap is prevented while the cap is being installed on, removed from, a pickup truck bed, or while the cap is being transported to or from storage. In a further embodiment, the cap includes a rear hatch and the support bar is combined with the hatch latch. In such embodiment the latch ends each have a means for detachably securing the ends of the support bar-latch to the lower rear sidewalls of the cap and a means to hold the latch ends in a rigid, extended position is provided.

5 Claims, 3 Drawing Sheets

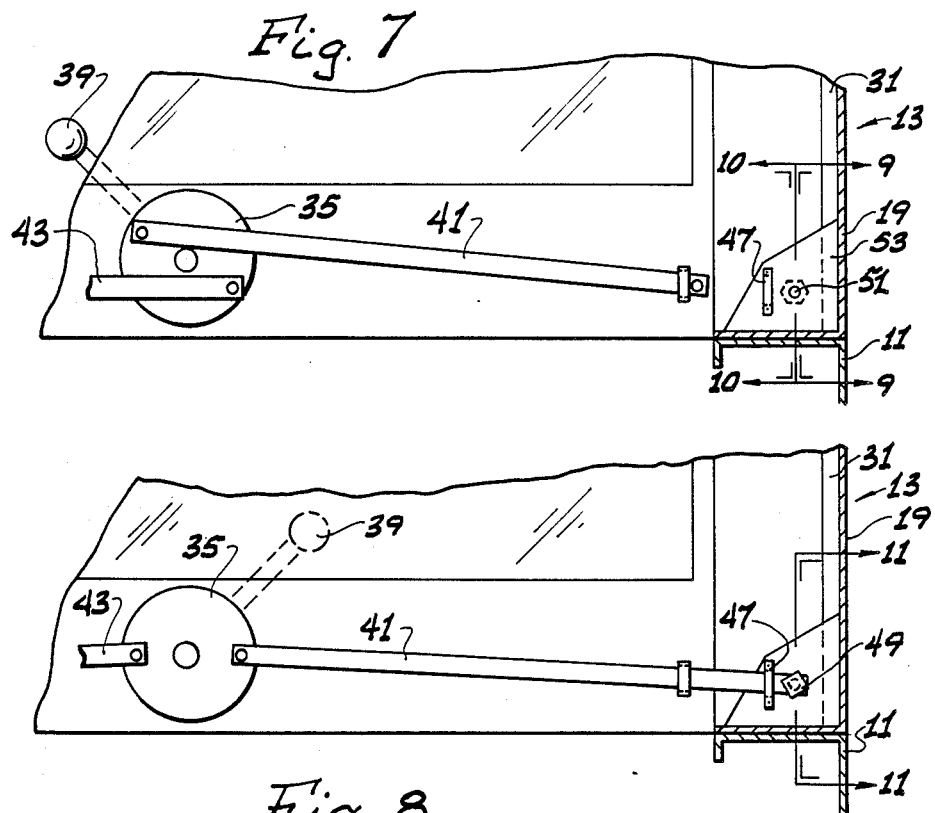
Fig. 7
Fig. 8
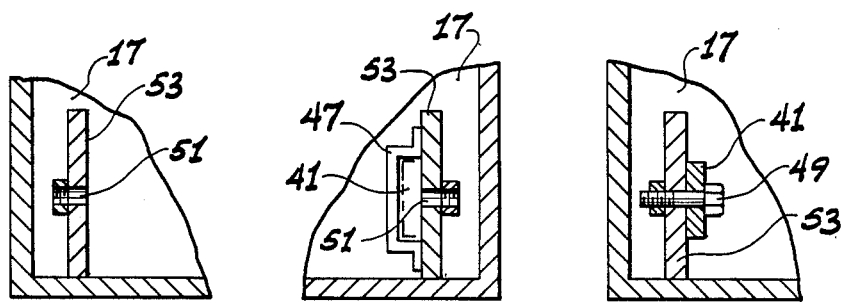
Fig. 9    Fig. 10    Fig. 11

PICKUP TRUCK CAP

The present application is a continuation-in-part of application Ser. No. 07/206,433 filed Aug. 22, 1988 now abandoned.

BACKGROUND OF THE INVENTION

The present invention relates to an improved detachable vehicle cap, or cover, and in particular to the type of caps used in conjunction with conventional pick-up trucks. In general there are two types of pickup caps. One type has the form of a shell having an open bottom and is usually bolted, or otherwise attached, to the top portion of the cargo space sidewalls. The other type of cap is a unitary box-like structure, resembling a building in design, usually having a closed bottom and fits partly within and partly without the cargo space. The present invention relates to the former, shell type, cap. Examples of such shell type caps are described in U.S. Pat. Nos. 3,390;913; 4,431,228, and 4,452,482.

The shell type caps to which the present invention relates usually have generally planar sidewalls and top portions, and are typically molded of fiberglass or lightweight metal. In lateral cross-section, such caps have a generally inverted U-shape. Shell type caps usually have a windowed rear, or hatch, portion to allow access to the interior of the cap and to provide rear vision for the driver. Typically, such caps have an integral front portion, usually windowed, positioned adjacent the truck cab. The caps are removeably detachable from the truck to facilitate the use of the truck for other purposes. The cap is typically removed from the truck bed by detaching the hold-down means and lifting the cap, either manually, or by other means, such as, jacks, a sufficient height to clear the cargo space sidewalls. The upraised cap is then moved, usually manually, to clear the vehicle structure. The cap may then be stored directly on the ground, on a prepared storage platform, or more normally, on planks in a storage area. The cap is normally replaced on the truck body be reversing the removal process.

The problem to which the present invention is addressed results from the processes of placing and replacing the cap on the truck body. The cap sidewalls nearer the hatch end are not held in attached alignment with the rear, or hatch, end of the cap because the hatch opening from the bottom prevents dimensional stabilization across the bottom rear portion of the cap. For example, when the hatch is in an open position no lateral support, either inwardly or outwardly, is provided because of the hatch opening. When the hatch is in a closed position the sidewalls have no lateral support against outward movement. In the process of lifting and moving the cap to place it on, or remove it from, the truck bed, especially if such placing or removing is carried out in a manual fashion, the bottom rear portion of the sidewall is conveniently and usually gripped and used as a lifting and carrying area. The movement of the sidewalls inward or outward, or wobbling in and out, causes stresses to develop in the upper rear corners of the cap. Such stresses soon cause either a splitting of the door frame or a cracking in the upper rear portion of the cap, particularly near the junction of the upper sidewalls and the rear wall. Such cracks, or splits, not only result in the unsightly destruction of the outer cover plate or skin of the cap, but they result in structural damage to the cap and are the cause of leaks in the cap. Such cracks, or splits, are difficult to repair and even if repaired are subject to recracking, or resplitting, upon the next placement or removal of the cap from the truck bed.

BRIEF DESCRIPTION OF THE INVENTION

The present invention relates to an improved shell-type pickup truck cap having a means for preventing damage to the cap when it is being installed on, or removed from, the bed of a pickup truck, or when said cap is being transported to or from storage. The present cap comprises a substantially planar top, logitudinal sidewalls and a rear wall of a substantially inverted U-shaped configuration, which typically is or includes a hatch. An elongated support, or spacing bar is provided to be rigidly positioned across the opposite internal bottom portions of the sidewalls. The support bar is suitably detachably secured to the bottom rear portions of each of the sidewalls to span the distance between the sidewalls and to substantially prevent inward or outward movement of the sidewalls. In this manner damage to the upper rear of the cap is prevented while the cap is being installed on, or removed from a pickup truck bed; or while the cap is being transported to or from storage.

In a particularly useful embodiment of the invention, the cap includes a rear hatch and the support bar is combined with the hatch latch. In such embodiment, the latch ends each have a means for detachably securing the ends of the support bar-latch to the lower rear sidewalls of the cap and a means to hold the latch ends in a rigid, extended position is provided.

It is desirable that the present support, or spacer bar, be in place before manual transportation of the cap is initiated, and that it is easily removeable after installation of the cap. Thus, in a preferred mode, the support means is both removeable and attachable to the cap sidewalls while the cap is positioned in the truck bed.

DETAILED DESCRIPTION AND PREFERRED EMBODIMENTS OF INVENTION

The present invention will now be described by reference to the accompanying drawings which are to be interpreted as illustrative of, and not limiting to, the invention. Similar components are indicated by similar numbers in each of the views.

FIG. 7 is a detailed view of the hatch latch of FIG. 6, taken from inside the cap and frame, showing the support bar in a non-aligned position, enabling the hatch portion of the cap to be raised to an opened horizontal position.

FIG. 8 is a detailed view of the hatch latch of FIG. 6, also taken from inside the cap and frame, showing the support bar in an aligned position (as it is in FIG. 6) enabling the hatch to be maintained in its normal, downwardly closed position.

FIG. 9 is a vertical cross-sectional view of the mechanical arrangement at the side of the cap and tail gate, taken along the line 9—9 of FIG. 7 when the support bar 41 of FIG. 7 is in its non-aligned position.

FIG. 10 is a vertical cross-sectional view of the mechanical arrangement at the side of the cap and tail gate, taken along the line 10—10 of FIG. 7 when the support bar 41 is in its non-aligned position.

FIG. 11 is a vertical cross-sectional view of the mechanical arrangement at the side of the cap and tail gate, taken along the line 11—11 of FIG. 8 when the support bar 41 is in its aligned position.

Figure 1:
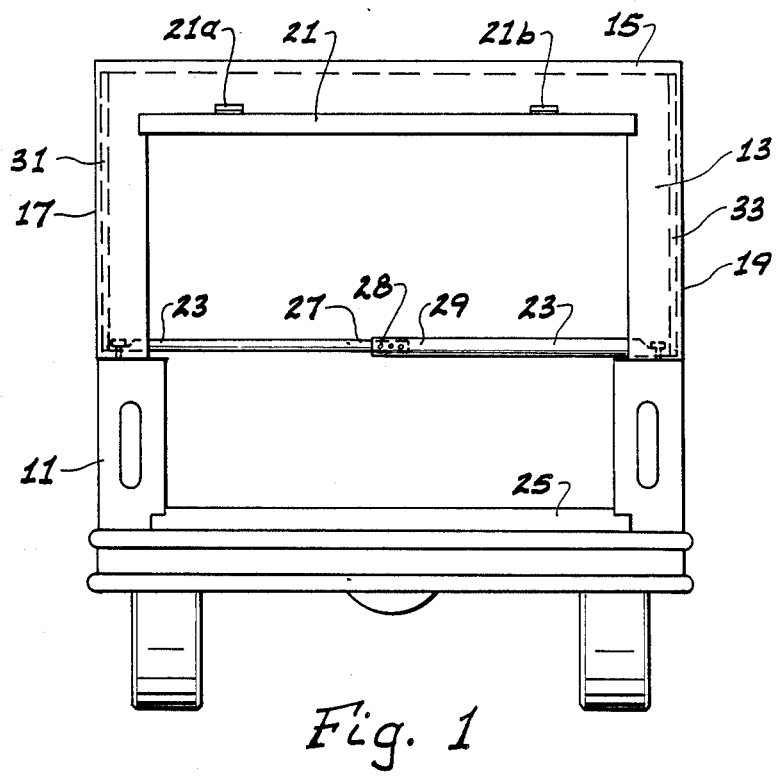
FIG. 1 is a rear elevational view of the present pickup cap, or shell, and of the truck frame to which it is attached, showing the present support bar in position across the bottom rear portion of the cap.
Figure 4:
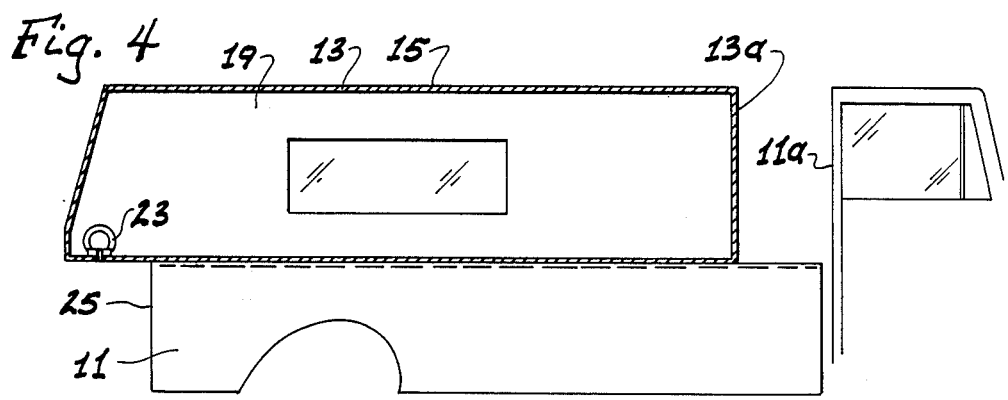
FIG. 4 is a side elevational view of the present pickup cap, or shell, and of the cab and truck bed to which it is attached.

Referring once more to FIG. 1, a conventional pickup truck, is generally designated at 11. Such pickup trucks have a cargo compartment, or space, located rearward of the truck cab 11a (FIG. 4), a generally flat bed, or floor, relatively longitudinally opposed upstanding parallel sides and relatively laterally opposed upstanding ends; the rear end of the bed has a rearwardly opening, hinged, tail gate adapted to be normally maintained in an upwardly closed position by a conventional latch means. The cargo space of truck 11 has a shell type cap, or cover, 13 mounted thereon. As described herein the rear of the cap is that portion of the cap that would be positioned at the rear of the truck when the cap is installed in the truck. Cap 13 is comprised of a substantially planar top, 15, connected to two spacially arranged, laterally opposed, substantially planar sidewalls, or panels, 17 and 19. Sidewalls 17 and 19 are typically windowed. Cap 13 is equipped with a top hinged, windowed, rear wall, which is substantially comprised of a hatch, 21 which is typically comprised of a moveable hatch member which cooperates with tailgate 25, to enclose the rear of the cargo space. In FIG. 1, hatch, or rear wall, 21 and tailgate 25 are shown in open positions. Cap 13 may have a front wall 13a positioned adjacent the cap portion 11a of truck 11, or be equipped with a sealing means (not shown) to seal the front portion of cap 13 with the truck cab. Typically cap 13 is fabricated of a plastic, such as, polypropylene, or of fiberglass, or metals, such as, aluminum or steel. Cap 13 is suitably secured to truck 11 by hold-down means, not shown, normally positioned along the sides of the truck enclosing the cargo space, i.e., the side cargo walls.

The rear wall, or hatch portion, 21, is hinged along its upper portion at 21a and 21b and is outwardly moveable, or swingable, to an open position. Typically hatched, or rear wall 21 occupied only the portion of the rear opening of cap 13 which is located above the top of the truck tail gate when the trail gate is in a closed position. The hatch is moveable, or swingable via hinges 21a and 21b above the tail gate 25 to open and closed positions. In conjunction with the tail gate, hatch 21 provides a closure means for selectively permitting the entry and discharge of passengers, or cargo.

Cap 13 is typically placed in the cargo space of truck 11 by initially aligning the cap with the rear end of the truck, then lifting and moving the cap in a direction toward the truck until the truck bed and cap are aligned. The cap is then lowered and secured to the side cargo walls of the truck, suitably, by bolting. The cap is typically removed from the truck by reversing the placement procedure.

In transporting the cap or in removing the cap from, or installing the cap on a truck bed, the bottom portion of sidewalls 17 and 19 are conveniently and typically utilized as lifting sites. Since the hatch door is hinged at the top of the rear wall, the bottom portion of sidewalls 17 and 19, especially the bottom rear portions of sidewalls 17 and 19, are unsupported in a lateral direction. In lifting the cap the unsupported bottom rear portions flare outward, and as the cap is lifted such flaring is accentuated by the weight of the cap. Such flaring produces stress concentrations in the upper rear corner portions of the cap, usually contiguous to the top of the hatch door. When the stress limit of the material of which the cap is fabricated is exceeded, the material fractures, or cracks.

Figure 2:
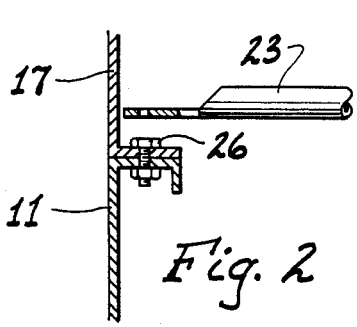
FIG. 2 is a cross-sectional view showing a cap bolted to a truck frame before a spacer bar is bolted to the cap.
Figure 3:
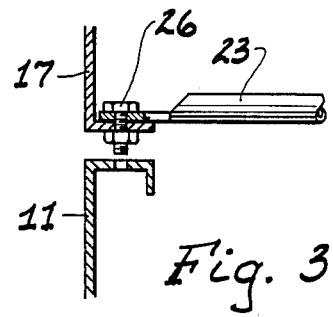
FIG. 3 is a cross-sectional view showing the spacer bar bolted to the cap after the cap has been unbolted from the truck frame.

To avert such flaring and subsequent damage, the present improved cap has an elongated, rigid support, or spacing, bar positioned to span the normal internal distance between bottom rear portions of sidewalls 17 and 19 to provide rigid, secure lateral support to the sidewalls, substantially eliminating independent outward or inward movement of the rear bottom portions of the sidewalls. Support bar 23 is detachably secured to the bottom portions of sidewalls 17 and 19. suitably, for example, by means as shown in FIGS. 2 and 3. Support bar 23 is suitably adjustable to be adapted to the normal internal widths of various truck caps. Support bar 23 for example, may be made adjustable by utilizing telescoping portions, such as 27 and 29, which may be threadably connected, or spacedly secured in relation to each other by using aligning pins positioned in spaced perforations 28 in the telescoping portions.

The ends of support bar 23 may suitably be shaped to receive and fit various types and widths and possible curved shapes of cap sidewalls, such as 17 and 19; or various types and sizes of internal rear frame members, such as 31 and 33. As shown in FIG. 3, the ends of bar 23 are substantially flattened and are adapted to be secured to the bottom portion of the cap sidewalls, or to the bottom or side portions of the rear frame members with nut and bolt 26. The ends of bar 23 may also be curved upward or downward (not shown) to facilitate placement, or fitting, of the bar member across the bottom interior of the rear portion of the cap.

Figure 5:
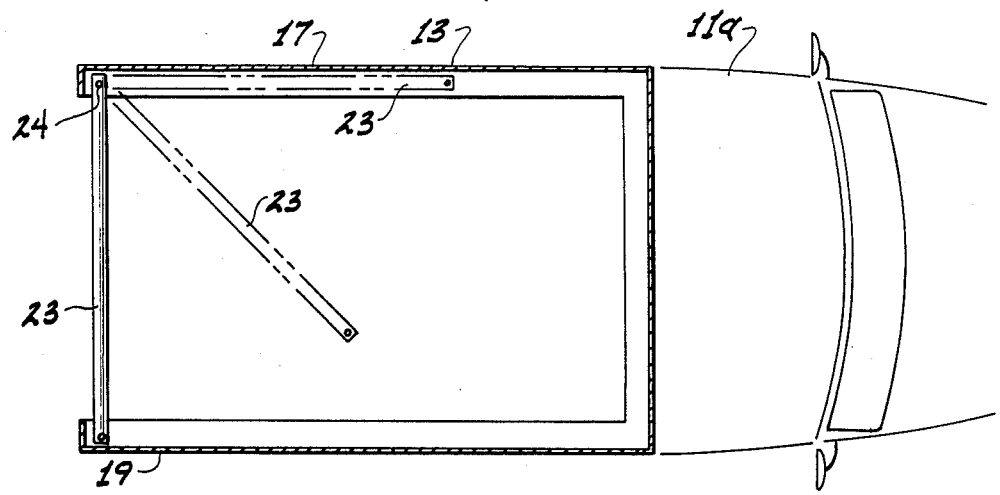
FIG. 5 is a top sectional view of the cap and cab; and showing a support bar hingeably attached to an internal portion of one of the side walls of the cap.

As shown in FIG. 5, support bar 23 may be hingedly, for example, by a hinge such as 24, attached to the internal bottom portion of one of the sidewalls and moveable, or swingable, from an in use position, spanning sidewalls 17 and 19, to a stored position in which bar 23 is securely stowed within cap 13 along an internal side of one of the sidewalls.

Figure 6:
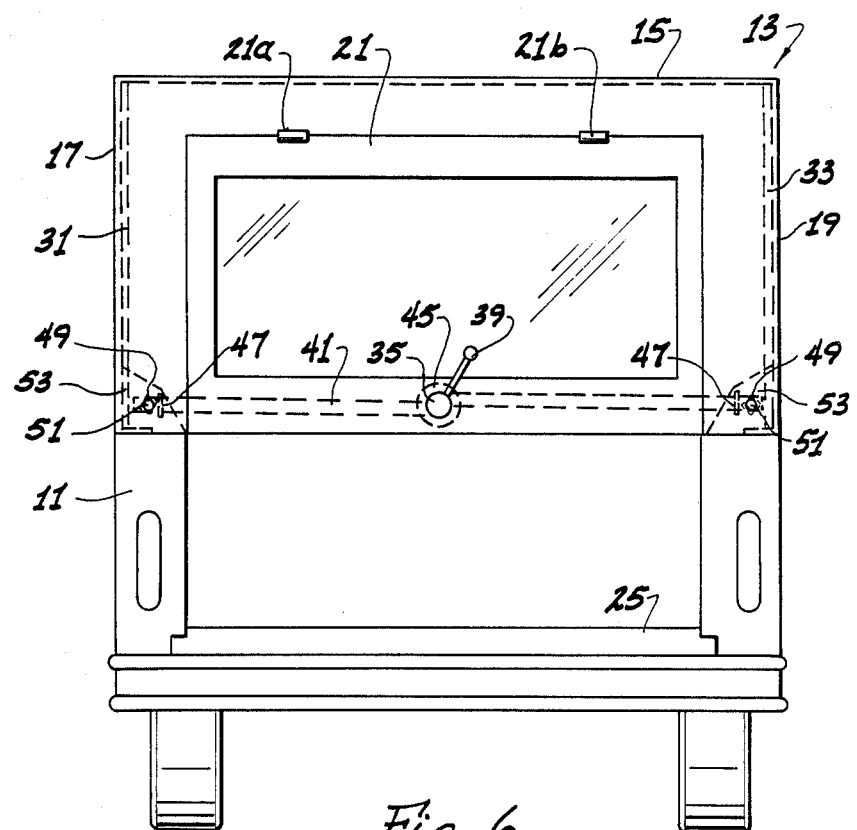
FIG. 6 is a rear elevational view of the pickup cap and truck frame, taken from outside the cap and frame, showing an alternate embodiment of the present truck cap. This view illustrates an embodiment of the cap, per se, in which the support bar (shown in dotted lines) also functions as, or is combined with, the hatch latch of the cap.

FIG. 6 illustrates an embodiment of the invention in which the functions of spacer bar 23, described above, are incorporated in the functions of a hatch latch mechanism, 35.

In this embodiment, viewed from the outside of the cap, rearwardly opening hatch, 21, is shown in the closed position. Hatch 21 has latch mechanism 35, suitable positioned at, or near, the lower center portion of the hatch door. Latch mechanism 35 has a handle or crank, 39, on the outside of the cap which operates rigid, elongated latch arms, 41 and 43 on the inside of the cap. Latch arms, 41 and 43, move through coupling means 45 of the latch mechanism from an open, or unlatched, position in which the latch arms are unextended, (as shown in FIG. 7); that is they are positioned within the confines of the hatch door, to a locked, or latched, position (FIG. 8) in which the ends of latch arms 41 and 43 extend through, and remain in, openings, such as, 47, typically in the cap rear frame members. Latch mechanism 35 may suitably be operated manually or automatically, typically, electrically.

The ends of latch arms 41 and 43 are releasably secureable within openings such as 47 by a securing means, for example, pins or bolts, such as, 49, through a hole, such as, 51, which may be positioned in a reinforced portion, such as, 53, of the lower portion of the rear sidewalls 17 and 19. In this manner latch arms 41 and 43 are held in a rigid position spanning the internal distance between the bottom rear portions of cap 13. The positioning of lever arms 41 and 43 in a rigid arrangement across the bottom rear of cap 13 substantially eliminated lateral movement of the bottom rear portions of cap 13. Cap 13 may be then moved with a minimum of risk damage because of leveraged sidewall movement.

It will be appreciated that the foregoing specification and the accompanying drawings are set forth by way if illustration and not limitation, and that various modifications and changes may be made therein without departing from the spirit and scope of the present invention which is to be limited solely by the scope of the appended claims.

What is claimed is:

1. An improved shell-type pickup truck cap having a means for preventing damage to the cap when it is being installed or removed from the bed of a pickup truck, or when said cap is being transported to or from storage, said cap comprising:
   a. a substantially planar top, opposite, spacedly arranged longitudinal sidewalls and a rear wall of a substantially inverted U-shaped configuration; and
   b. a rigid, elongated support bar spanning the distance between said sidewalls, said bar detachably secured to the bottom rear portions of said cap to substantially prevent lateral movement of the cap sidewalls when said bar is secured in place between said sidewalls thereby preventing damage to the upper rear portions of the cap while said cap is being installed on, removed from, or being transported to or from storage.
2. The cap of claim 1 wherein said support bar is adjustable.
3. The cap of claim 1 wherein said support bar telescopes.
4. The cap of claim 1 wherein said rear wall includes a top hinged, rearwardly opening hatch and said support bar functions as a hatch latch.
5. The cap of claim 1 wherein one end of said support bar is hingeably attached to an internal portion of one of said side walls.

* * * * *